Nov. 19, 1935.  G. A. PAGE, JR  2,021,325
WHEEL FAIRING
Filed July 8, 1932   2 Sheets-Sheet 1
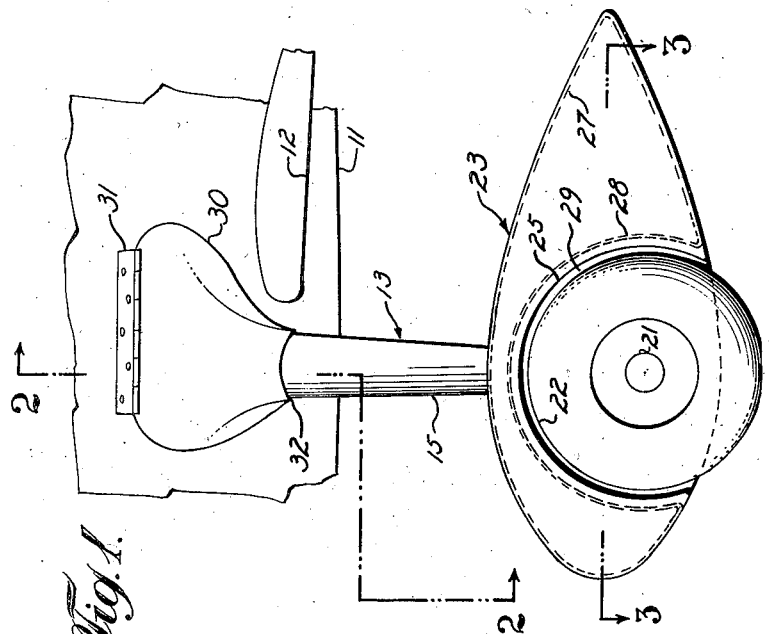
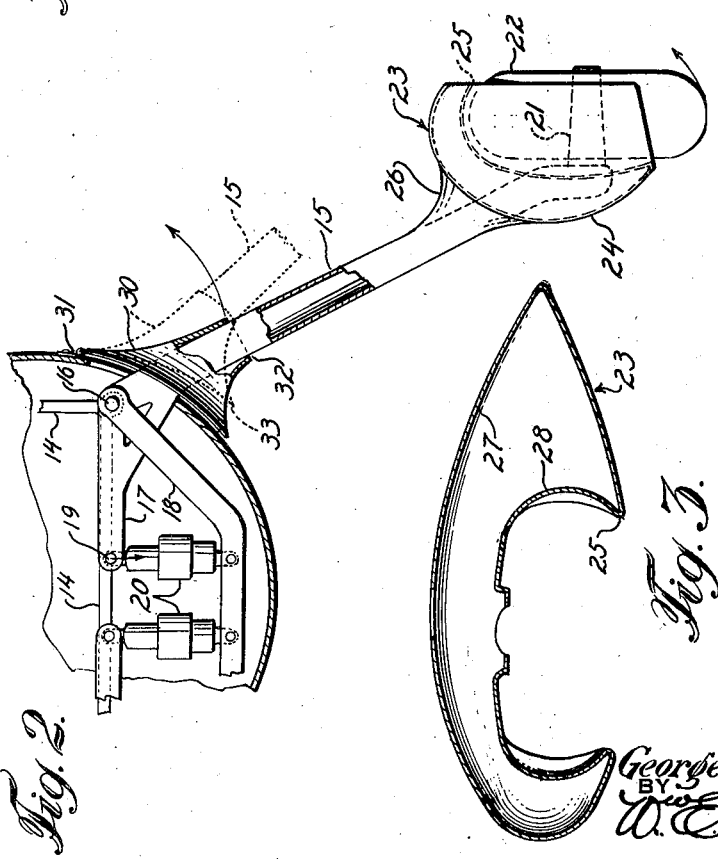
INVENTOR
George A. Page Jr.
BY
ATTORNEY Nov. 19, 1935.  G. A. PAGE, JR  2,021,325
WHEEL FAIRING
Filed July 8, 1932  2 Sheets-Sheet 2
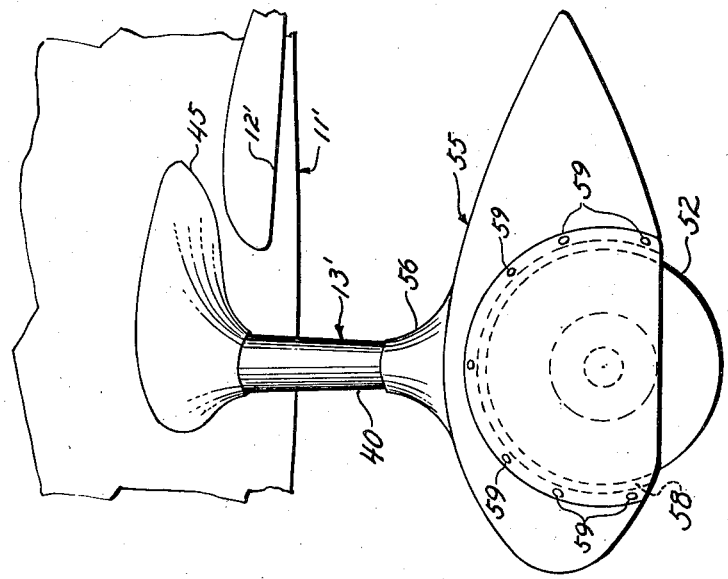
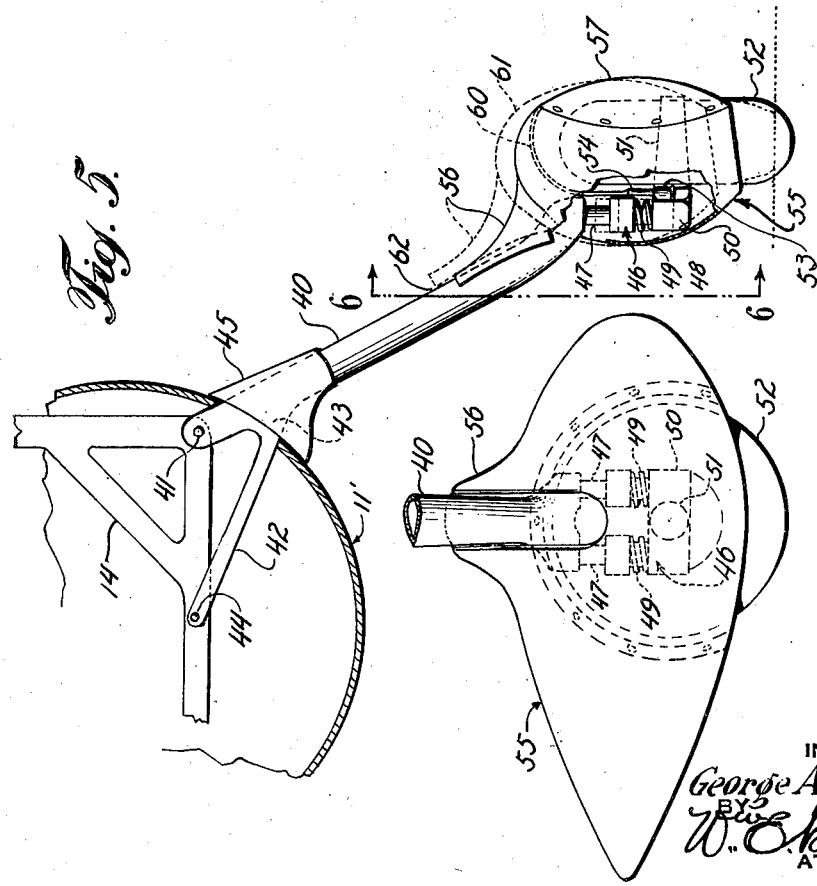
INVENTOR
George A. Page Jr.
BY
ATTORNEY Patented Nov. 19, 1935

2,021,325

UNITED STATES PATENT OFFICE 2,021,325

WHEEL FAIRING

George A. Page, Jr., Freeport, N. Y., assignor to Curtiss Aeroplane & Motor Company, Inc., a corporation of New York Application July 8, 1932, Serial No. 621,371

4 Claims. (Cl. 244—2)

This invention relates to aircraft landing gears, and more particularly to improvements in streamline fairings for the wheels and struts of airplane landing gears.

The usual form of airplane landing gear comprises a strut or several struts depending from the body or fuselage of the airplane. To the lower end of the struts is attached an axle on which is mounted a wheel for ground contact. Either at the wheel end of the strut or at some other point in the strut system is located a shock absorbing device to absorb impact when the airplane lands, and likewise the shock absorbing device acts as a taxiing spring when the airplane is rolled along the ground. In this conventional form of landing gear, considerable head resistance is built up as the airplane passes through the air, and it has been found beneficial to reduce this head resistance by applying to various portions of the landing gear streamline cowlings or fairings. It is possible to increase the speed of an airplane as much as 12 to 15 miles an hour by applying efficient streamline fairings. The most important point for the application of streamline fairings to the landing gear is in the neighborhood of the wheel, and various forms of wheel fairings have been used in the last several years. The first wheel fairings comprised a streamline envelope which housed all of the upper portion of the wheel, leaving a comparatively small exposed portion of the tire at the bottom, for ground contact. Such fairings were usually made with flat sides and were so fastened to the landing gear or to the axles that considerable time and labor were required whenever it became necessary to change a wheel or a tire. The whole fairing would have to be removed before the tire or wheel could be removed, entailing expense and delay. Likewise, the original forms of wheel fairings, although better than no fairing at all, had not been developed to a point of high aerodynamic efficiency.

The struts on landing gears have likewise been of such nature that more than the necessary minimum of head resistance was built up by their shape and form. It has been found that satisfactory landing gears can be applied to an airplane using only a strong single strut depending from the fuselage, to which the landing wheel may be attached. Fairings at the upper end of this strut at its point of juncture with the fuselage can also be applied to obtain an additional decrease in head resistance, and hence an increase in speed.

My invention includes two forms of improved streamline wheel fairings and also includes shock absorber, strut, and strut fairing arrangements which in their proper combinations, give results most favorable to a reduction in landing gear head resistance.

One object of my invention is to provide a streamline wheel fairing allowing for great accessibility to the wheel, wherein the wheel forms a part of the streamline form of the fairing as a whole with little or no reduction in efficiency of the fairing.

Another object of my invention is to provide a wheel fairing having a readily detachable side cover which, when removed, allows the wheel to be removed with little trouble.

Another object of my invention is to provide an improved form of wheel fairing having greater aerodynamic efficiency than has been heretofore obtained.

A further object of my invention is to provide a landing gear and fairing arrangement having a shock absorber adjacent the wheel and having a streamline fairing movable with the wheel and with respect to the landing gear strut, so that the wheel is always in a constant position with respect to the fairing.

A further object of my invention is to provide a landing gear arrangement comprising a single strut pivoted within the body of the airplane and having an improved form of fairing at the juncture of the strut and body portion.

A still further object of my invention is to provide a wheel fairing which may be easily cleaned of mud, etc., without the removal of part of the assembly.

In the drawings, wherein like reference characters denote like or corresponding parts, Fig. 1 is a side elevation of a portion of an airplane embodying features of my invention;

Fig. 2 is a section on the line 2—2 of Fig. 1;

Fig. 3 is a section on the line 3—3 of Fig. 1;

Fig. 4 is a side elevation of a portion of an airplane illustrating an alternative construction;

Fig. 5 is a front elevation of the structure of Fig. 4, partly broken away; and

Fig. 6 is a section on the line 6—6 of Fig. 5.

Referring to Figs. 1, 2 and 3, 11 is the body of an airplane having a wing 12 and a landing gear 13. Within the body 11 is a skeleton structure 14 to which structural members of the airplane including the landing gear 13 are attached. The landing gear 13 comprises a streamline strut 15 pivoted at 16 to the structure 14 and having a substantially horizontal member 17 projecting inwardly into the body 11. A tension member 18 is attached to the structure 14 as at 16 and projects below the structure 14 but within the body 11. Between the end 19 of the member 17, and the member 18, is placed a compression shock absorber 20 of more or less conventional form.

At the lower end of the strut 15 is fixed a stub axle 21 on which a wheel 22 is mounted for rotation. In Fig. 2 the landing gear is shown in solid lines in the flying position, and part of the strut 15 is shown by dotted lines in the position that the strut 15 would assume when the airplane is on the ground. When in the air, the landing wheel 22, the strut 15 and its associated parts would be in a hanging position, allowing extension of the shock absorber 20. Upon landing, the wheel 22 would be driven upwardly with relation to the airplane, which action would be resiliently counteracted by the compression of the shock absorber 20.

Attached to the strut 15, and surrounding the wheel 22, is a wheel fairing or boot 23. The fairing 23 has a streamline form from front to rear, and has a partly elliptical cross section. The fairing covers the inner or strut side of the wheel 22 as at 24, and the inner side of the fairing 23 is of convex shape to provide for more efficient streamline action. The fairing 23 is constructed with an opening 25 which frames the wheel 22 on the outside or on the side opposite the strut. This opening 25 is of slightly larger diameter than the diameter of the wheel 22, so that by removal of the conventional locking means which holds the wheel 22 on its axle 21, the wheel 22 may be withdrawn from the axle.

The shape of the fairing 23 in cross section is evolved from an elliptical shape in which ellipse, the minor axis is a substantial portion—usually greater than 50%—of the major axis. This form of cross section for the fairing 23 produces a considerably lower head resistance than a cross section having flat sides or having a minor axis of far less ratio to the major axis. The wheel fairing 23 is attached rigidly to the strut 15 and is merged into the strut 15 by an auxiliary fairing 26.

The fairing 23 is formed from two shells 27 and 28 with suitable structural bracing not shown. The shell 27 is formed in the streamline previously described, while the inner shell 28 is formed to embrace the circular contour of the wheel 22. The inner shell 28 forms a guard for the wheel and prevents the accumulation of excessive quantities of mud when the aircraft may be called upon to roll over wet or muddy ground. Likewise, by the insertion of a hose through the aperture 29 between the wheel 22 and the opening 25 of the fairing 23, accumulations of mud can be readily washed away. If the inner shell 28 were omitted, large quantities of mud could readily accumulate within the outer streamline fairing 27 which would be difficult to clean and which in the course of time could increase in weight to an undesirable degree.

It will be noted that by the conformation of the surface 24 of the streamline fairing 23, the lower end of the strut 15 and the juncture of the axle 21 with the strut 15 is completely housed and streamlined.

At the upper end of the strut 15 an auxiliary strut fairing 30 is hinged as at 31 to the body 11. The strut fairing 30 encircles the strut 15 at 32, but is slidable therealong. In the flying position, as shown in solid lines, the strut fairing 30 is formed to lie close against the body 11. In the landing position, as shown in dotted lines in Fig. 2; the strut 15 is raised at an angle with respect to the body 11, whereupon the strut fairing 30 moves about its hinge 31 and separates as at 33 from the body 11. This separation, in the landing position, is in no way objectionable, for under this condition the airplane is either stopped or is moving slowly so that the benefit of the streamline fairing is not required. As soon as the airplane takes off, the strut 15 again assumes its lower position and the fairing 30 rotates about its hinge 31 and assumes a position close to the body 11.

An additional advantage is gained by this strut fairing 30, for the reason that, while on the ground, the separation as at 33, allows of inspection of the landing gear pivot 16 without the removal of inspection plates, etc. In the above description, the wheel fairing 23 and the strut fairing 30, with their conformation and arrangement, are the principal features of the invention.

An alternative arrangement of my invention shown in Figs. 4, 5 and 6 will now be described. As in the previously described embodiment, an airplane body 11', having a wing 12' and a landing gear 13', has within the body portion 11 a structural framework 14. To the framework 14 is attached a landing gear strut 40, as at the point 41. A bracing member 42, joined to the strut 40 at 43, is attached to the framework 14 at 44. A rigidly attached strut fairing 45 serves to merge the strut 40 into the body 11.

At the lower end of the strut 40 is attached a shock absorbing mechanism 46 comprising generally, plungers 47 and cylinders 48 slidable vertically thereon, and having interposed therebetween resilient means 49 for the absorption of shocks. Additional mechanism of conventional type may be included within the shock absorber 46 for the cushioning of shocks. At the lower end of the cylinder portion 48 is a boss 50 to which is rigidly attached an axle 51. A wheel 52 is mounted for rotation about the axle. The boss 50 is provided with sockets 53 into which are inserted lugs 54 which carry a wheel fairing 55.

The wheel fairing 55 is generally similar in conformation to the wheel fairing 23 shown in Fig. 2. Its principal difference from the previously described wheel fairing lies in an auxiliary fairing member 56 attached to the fairing 55 which is adapted to lie against and to carry out the streamline shape of the strut 40 when the landing gear is in flying position. The wheel fairing 55 is likewise provided with a detachable cover 57, which cover is shaped to lie over an opening 58 in the side of the fairing 55, the opening 58 being shaped to allow for installation and withdrawal of the wheel 52 from its axle 51 without interfering with any other parts of the mechanism. The cover 57 is formed to carry out the elliptical cross section of the wheel fairing 55 and is attached by suitable fastening means to the fairing 55 as at the points 59. The wheel fairing 55 is provided with an inner shell 60 conforming to the outline of the wheel 52, acting as a mudguard in the same manner as the inner shell 28 of the wheel fairing 23 in the previously described embodiment.

Fig. 5 shows in solid lines at its lower portion the position assumed by the wheel 52 and the wheel fairing 55 when the landing gear 13 is in the flying position. It will be seen that the auxiliary fairing 56 lies close to the strut 40. In the landing position, the wheel 52 is elevated with respect to the strut 40 through the shock absorber 46 and, since the wheel fairing 55 is firmly attached to the boss 53 of the movable portion of the shock absorber 46, it likewise moves with the wheel to a position such as is shown by the dotted lines as at 61. The auxiliary fairing 56, being formed as part of the wheel fairing 55 likewise raises with respect to the strut 40, permitting of a space 62 between the auxiliary fairing 56 and the strut 40. Immediately upon taking off of the airplane, the wheel 52 with its associated fairing 55 assumes its flying position as shown by the solid lines, whereupon the auxiliary fairing 56 again merges with the strut 40.

It is obvious that the wheel fairing 55 having a cover plate 57, as embodied in Figs. 4, 5 and 6, may be used with equal facility on the landing gear embodiment shown in Figs. 1, 2 and 3, in place of the wheel fairing 23. Conversely, the wheel fairing 23 of Figs. 1, 2 and 3 may be used with equal facility in the landing gear of Figs. 4, 5 and 6.

Although I have shown and described landing gears incorporating a single strut, wheel fairings such as herein described, can be used with equally beneficial results on other forms of landing gears incorporating additional struts or wire bracing. Likewise, the arrangement of the strut fairing 30 can be used with equal facility on other struts used in connection with an airplane, and I do not desire to limit the application of the strut fairing to a single landing gear strut. By extensive aerodynamic testing, it has been found that the wheel fairing in which one side of the wheel substantially carries out the line of the fairing, produces very little greater drag than if the fairing were continuous over the whole upper portion of the wheel. By this construction, there is provided an efficient wheel fairing which gives great advantages with respect to each of maintenance of the airplane landing gear.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications and changes.

What is claimed is:

1. In aircraft, a body, a landing gear strut pivoted to said body, and a fairing hinged to said body and surrounding said strut, said fairing being movable both with and with respect to said strut.

2. In aircraft, a streamline strut springing from a body, said strut being movable with respect to said body upon landing of said aircraft, but being relatively immovable with respect to said body when said aircraft is in flight, and a fairing adapted to merge the joint between said body and said strut when said aircraft is in flight, said fairing being movable with respect to said strut and to said body upon movement of said strut relative to said body.

3. In aircraft, a streamline strut springing from a body, said strut being movable with respect to said body upon landing of said aircraft, but being relatively immovable with respect to said body when said aircraft is in flight, and a fairing adapted to merge the joint between said body and said strut when said aircraft is in flight, said fairing being movable with respect to said body upon movement of said strut relative to said body.

4. In aircraft having a body, a single streamline landing gear strut extending outwardly and downwardly from, and cantilevered with respect to said body, a landing wheel carried by said strut at the outer end thereof, said wheel being movable with respect to said body upon landing of said aircraft, and a streamline fairing adapted to merge with the streamline of said strut when said aircraft is in flight, said fairing being movable with respect to said strut and to said body upon movement of said wheel relative to said body.

GEORGE A. PAGE, Jr.